United States Patent Office 2,929,801
Patented Mar. 22, 1960

2,929,801

ELASTIC AMIDE/URETHANE/ETHER COPOLYMERS AND PROCESS FOR MAKING THE SAME

Charles Richard Koller, Newark, Del., assignor to E. I. du Pont de Nemours and Company, Wilmington, Del., a corporation of Delaware No Drawing. Application January 31, 1955
Serial No. 485,289

19 Claims. (Cl. 260—77.5)

This invention relates to new linear polymers comprising amides linked to polyethers through urethane groups and especially to the elastic products obtained from certain of these compositions. This invention relates particularly to the filaments prepared from these copolyamides.

Attempts are constantly being made to improve polymers utilized in such applications as films and molded objects and particularly as filaments which will be utilized in such applications as woven and non-woven fabrics, felts, papers, and the like. For example, intensive efforts have been made in recent years to improve the dyeability and wearing comfort of the synthetic fibers. One approach has been to attempt to modify suitably the properties of the polymers which have gained commercial acceptance. A more difficult but potentially more fruitful long range approach is to synthesize new polymers free of the deficiencies of those now available. There is a particular need in textile and allied fields for a synthetic material to replace rubber, which in textile applications, possesses a number of disadvantages which tend to offset its desirable elastic properties. It is therefore, desirable to find new materials which are highly elastic, have higher moduli and better abrasion resistance than rubber, and which are particularly suited to the preparation of filaments, but which do not possess the undesirable characteristics of rubber.

An object of this invention, therefore, is to provide new polymers which can be formed into films and molded objects and which are particularly suited to the formation of filaments which can be utilized in fabrics, papers, felts, and similar applications. Another object is to provide a process for preparing copolymers of this type which are suitable for filament formation. A further object is to provide synthetic polymers and filaments which possess high elastic recovery. An additional object is to prepare copolymers and filaments which have both a high polymer melt temperature and a low second order transition temperature. These and other objects will be evident from the following discussion.

The objects of this invention are accomplished by utilizing a rapid, smooth polymerization technique which produces a linear polymer of the desired chemical composition and physical characteristics. As will be seen the polymer is a polyamide/urethane made by effecting condensation reactions between monomeric diamines, an amide-forming derivative of a difunctional acid, and a polyether bishaloformate derived from a polyether glycol. Small amounts of a bis(haloformate) derived from a low molecular weight glycol may also be used. The techniques that can be used are solution and interfacial polymerizations. The physical make-up of the polymer is such that it has a high melt temperature and a low second order transition temperature. This represents the first time a linear nitrogen containing polymer having these characteristics has been prepared. Physically, the polymer is composed of at least two segments: one segment which is crystalline and represents one or more repeating units of a polymer which melts above 200° C. in the fiber-forming molecular weight range (about 5000 or higher) and the second segment, chemically bonded to the first, which is also polymeric in nature but has a melting point below about 50° C. This latter segment is derived from a polyether glycol and the high melting segment is derived from a diamine and an acid chloride. The presence of these segments is shown graphically in the X-ray diffraction patterns and studies of the polymers of this invention. The polyether glycol can be readily selected from a large list of known polyethers having known melting points, and the melting points and crystalline characteristics of polyamide polymers prepared from the diamines and acids are well known or readily determined. The reactants may be fed simultaneously to a reaction zone, but it is preferable to mix the diamine and bis(haloformate) and shortly thereafter add the acid halide. Since the final products contain a polymeric section derived from the polyether glycol and a polyamide, they are copolyamide-urethanes. The amounts of the components are regulated and the elastomers which result are very readily shaped into elastic filaments.

Thus, this invention provides linear copolymers comprising (1) an amide segment or unit prepared from at least two complementary monomers capable of yielding a fiber-forming polymer having a polymer melt temperature of at least 200° C. in the fiber-forming molecular weight range linked through urethane groups to (2) a polyether having a molecular weight above about 400 (preferably between about 800 and about 5000) and a melting point below about 50° C. If the reactivities of the bis(haloformate) and the amide forming derivative of the difunctional acid are similar, these materials may be reacted simultaneously with the diamine. Generally, it is preferred to mix the bis(haloformate) and the diamine and shortly thereafter to add to the resultant mixture the acid derivative. By this method the formation of copolymers is readily achieved. Thus, the final products are amide/urethanes in which one of the components or segments is a polyether.

Usually, the amide products formed by the monomers mentioned in composition (1) would be homopolymers, but many monomers leading to copolymers are suitable. The polyether component is also usually a homopolymer, but frequently it is desirable to use a copolymer to modify the melting or solubility or other characteristics of the final amide/urethane polymers. Preparation of the filaments of this invention has not been demonstrated hitherto. The discovery of the melting point and molecular weight limitations for the macromolecule and the melting point limitation of the high melting component of the copolymers of this invention has provided linear polymers which are highly satisfactory for filament formation.

Compositions which contain about 10% to about 40% by weight of the high melting or, conversely, about 60% to 90% of the polyether segment will be elastomers. The processes described herein can be used for making polymers outside this range, but, in general, these do not result in elastic filaments as defined hereinafter. While such polymers can be used in articles requiring rigidity rather than elasticity, the preferred compositions and articles of this invention are those that are elastic. It has been found that the best elastomers are produced when the macrobis(haloformate) forms a segment which is substantially amorphous at room temperatures. Elastomers having polymer melt temperatures above 150° C. are preferred.

The elastic compositions of this invention show high elastic recovery (above 90%), low stress decay (below 20%), and frequently have higher moduli than rubber, which is the nearest known equivalent in terms of elastic properties. Elastic recovery is the percentage return to original length within one minute after the tension has been released from a sample which has been elongated 50% at the rate of 100% per minute and held at 50% elongation for one minute. Stress decay is the percent lost in stress in the yarn one minute after it has been elongated to 50% at the rate of 100% per minute.

The high melting component is polyamide in character, but as has been indicated previously, it is not essential that it be a homopolymer. Polymer compositions containing a majority of amide groups or segments which when prepared as separate polymers have polymer melt temperatures above 200° C. when the molecular weight is in the fiber-forming range are satisfactory. If the high melting component is a copolymer, it may be a copolyamide or it may contain polyurethane, polyurea or polysulfonamide linkages. In most instances the homopolymers are preferred. The preferred melting point for the high melting segment is dependent upon the length of this segment and, to some extent, upon the molecular weight of the polyether that is to be used. As the high melting segment becomes shorter, it is preferred that it be a unit of a higher melting polymer. For those copolymers in which the amide segment is reduced to the minimum (i.e., the polyether segments are separated by only a single unit of the polyamide), it is preferred that this amide unit be of a polymer which melts above 250° C.

The macroglycol from which the bis(haloformate) is derived may be a homopolymer or a copolymer. The essential features are that they be difunctional and have a melting point below about 50° C. The polyethers are primarily poly(alkylene oxide) glycols but some of the oxygens may be replaced with sulfur atoms and some of the alkylene radicals may be replaced with arylene or cycloaliphatic radicals. Even where the linkages are the same, the compositions may be copolymers, such as a copolyether derived from more than one glycol. Copolymers are particularly useful when one of the macromolecular homopolymers melts too high to be useful in the process. Copolymer formation can then be used to reduce the melting point and also reduce or minimize undesirable crystallization in this segment of the final copolymer. However, polymers prepared in accordance with this invention are similar in filament-forming and in elastic properties, while polymers prepared outside the melting point or molecular weight limitations of this invention will differ in such properties.

The scope of the invention is readily understood by referring to the following examples, which are given only for illustrative purposes and should not be considered to represent the limits of the invention.

*Example I*

Poly(tetramethylene oxide) glycol with a molecular weight of approximately 3230 was dried by heating under vacuum at 100° C. for about one-half hour or by dissolving it in anhydrous benzene and distilling at atmospheric pressure until the distillate was no longer turbid. The dried glycol was dissolved in dry benzene to produce a 30% solution. Phosgene was bubbled into this very rapidly or added as a liquid while the reaction mixture was cooled with ice. After an amount of phosgene about equal in weight to the glycol had been added, the addition was stopped and the solution was allowed to warm up to room temperature overnight while nitrogen was bubbled through the solution maintained under slight vacuum. After most of the excess phosgene had been removed in this manner, the benzene was removed by distilling under vacuum at 30–35° C. until a solution containing 80–90% of the bis(chloroformate) was obtained.

The benzene solution (26.84 grams) containing 90% by weight of the bis(chloroformate) of poly(tetramethylene oxide) glycol prepared as described above was placed in a reaction vessel containing 5.28 grams of sebacyl chloride and 250 ml. of dioxan. Distilled anhydrous hexamethylene diamine (7.15 grams) containing 0.31 gram of a conventional antioxidant was dissolved in 100 ml. of substantially anhydrous dioxan. This solution was added rapidly to the mixture of acid chlorides while stirring vigorously. There was an immediate rise in temperature, which reached 30–40° C. in about one minute and the reaction was complete in about three minutes. The hydrogen chloride liberated was taken up by the excess diamine present. The polymer was precipitated by addition of water, filtered, and washed with large quantities of boiling water. The polymer was then boiled with water to remove benzene and again filtered with suction. It was dried to constant weight in a 50° C. vacuum oven through which nitrogen was passed slowly.

The copolyamide urethane obtained contained 20% by weight of hexamethylene sebacamide units and 80% by weight of units derived from the reaction of hexamethylene diamine with the bis(chloroformate) of poly(tetramethylene oxide). The yield of polymer with an inherent viscosity of 1.10 and a polymer melt temperature of 195° C. was 90%. This polymer was extracted and melt spun at 210° C. to produce filaments with a tenacity of 0.41 g.p.d., an elongation of 960%, a stress decay of 10%, and a tensile recovery of 95%.

*Example II*

A benzene solution (36.82 grams) containing 82.7% by weight of the bis(chloroformate) of poly(tetramethylene oxide) glycol prepared as in the preceding example was mixed with 2.81 grams of adipyl chloride and 250 ml. of dioxan. Hexamethylene diamine (5.97 grams) containing 0.35 gram of antioxidant was dissolved in 100 ml. of dioxan. This solution was added rapidly with vigorous stirring to the mixture of acid chlorides. The polymer obtained was isolated, purified, and dried in a manner similar to that described in Example I. A product with a polymer melt temperature of 185° C. and an inherent viscosity of approximately 1.39 was obtained in better than 90% yield. This copolyamide urethane, which contained 10% by weight of hexamethylene adipamide units and 90% by weight of urethane units derived from the reaction of hexamethylene diamine with the bis(chloroformate) of poly(tetramethylene oxide), was melt spun at 206° C. The extruded filaments were drawn 3× and heat-set to produce filaments with a tenacity of 0.40 gram per denier, an elongation of 540%, a stress decay of 11%, and a tensile recovery of 96%.

*Example III*

The bis(chloroformate) of Example II (36.86 grams) was mixed with 4.47 grams of adipyl chloride and 250 ml. of dioxan and reacted with 8.18 grams of hexamethylene diamine containing 0.37 gram of antioxidant dissolved in 125 ml. of dioxan as described previously. The copolyamide urethane was obtained in 97% yield, had an inherent viscosity of 1.44 and contained 15% by weight of hexamethylene adipamide units and 85% by weight of the urethane units of the preceding example. The polymer was melt spun at 215° C., drawn 7× and heat-set to give filaments with a tenacity of 0.51 g.p.d., an elongation of 690%, a stress decay of 12%, and a tensile recovery of 93%.

*Example IV*

The bis(chloroformate) of the preceding example (30.63 grams) and 7.00 grams of adipyl chloride were mixed with 250 ml. of dioxan and reacted with 11.20 grams of hexamethylene diamine in 100 ml. of dioxan containing 0.35 gram of antioxidant. The copolyamide urethane was obtained in 92% yield, had an inherent viscosity of 1.32, and contained 25% by weight of hexamethylene adipamide units and 75% by weight of the urethane units of the preceding example.

A polymer prepared in a similar manner, but containing 20% of the hexamethylene adipamide units and 80% of the urethane units, and having an inherent viscosity of 1.36, was melt spun at 218° C. The filaments were drawn 6.5× and heat-set to produce filaments with a tenacity of 0.40 g.p.d., an elongation of 560%, a stress decay of 9.5%, and a tensile recovery of 95%.

*Example V*

The bis(chloroformate) from the preceding example (30.05 grams) was mixed with 8.85 grams of adipyl chloride and 200 ml. of dioxan and reacted with 13.62 grams of hexamethylene diamine dissolved in 100 ml. of dioxan containing 0.29 gram of antioxidant. The copolyamide urethane was obtained in 91% yield, had an inherent viscosity of 1.28 and a polymer melt temperature of 230° C. It contained 30% by weight of hexamethylene adipamide units and 70% by weight of the urethane units. A similar polymer containing 40% of hexamethylene adipamide units was prepared from the same ingredients under like conditions. The copolyamide urethane was obtained in 87% yield and had an inherent viscosity of 1.13 and a polymer melt temperature of 235° C.

*Example VI*

The bis(chloroformate) of poly(ethylene oxide) glycol with a molecular weight of 4000 was prepared as described in Example I. A benzene solution (36.53 grams) containing 57% by weight of this bis(chloroformate) was mixed with 4.45 grams of sebacyl chloride and 150 ml. of benzene. Hexamethylene diamine (5.78 grams) was dissolved in 100 ml. of benzene containing 0.26 gram of an antioxidant and the two solutions were mixed rapidly with efficient stirring. A polymer with an inherent viscosity of 2.11 was obtained. This copolyamide urethane contained 20% by weight of hexamethylene sebacamide and 80% by weight of urethane units derived from the reaction of hexamethylene diamine with the bis(chloroformate) of poly(ethylene oxide) glycol. The polymer was melt spun at 200° C., and the filaments obtained were drawn 9× and heat-set. They had a tenacity of 1.4 g.p.d., an elongation of 220%, a stress decay of 14%, and a tensile recovery of 75%.

*Example VII*

The bis(chloroformate) solution of the preceding example (44.02 grams) was mixed with 5.24 grams of terephthaloyl chloride and 200 ml. of benzene. Hexamethylene diamine (7.75 grams) was dissolved in 125 ml. of benzene and the two solutions mixed rapidly with efficient stirring. A polymer with an inherent viscosity of 1.18 was obtained in 99% yield. This copolyamide urethane contained 20% by weight of hexamethylene terephthalamide units and 80% by weight of the urethane units derived from the bis(chloroformate) of poly(ethylene oxide) and hexamethylene diamine. Filaments were prepared by melt spinning at 250° C.

*Example VIII*

The bis(chloroformate) solution made in accordance with Example VI (42.14 grams) was mixed with 4.91 grams of adipyl chloride and 200 ml. of benzene. Hexamethylene diamine (8.0 grams) was dissolved in 120 ml. of benzene containing 0.30 gram of an antioxidant. The two solutions were mixed rapidly with efficient stirring. A quantitative yield of polymer with an inherent viscosity of 1.58 and which could be melt spun at 215° C. was obtained. It contained 20% by weight of hexamethylene adipamide units and 80% by weight of the urethane units of Example VI.

*Example IX*

The bis(chloroformate) of a poly(tetramethylene oxide) glycol with a molecular weight of 3230 was prepared in the manner described previously. A benzene solution (36.17 grams) containing 82.7% by weight of this bis(chloroformate) was mixed with 5.78 grams of adipyl chloride and 200 ml. of dioxan. Heptamethylene diamine (11.08 grams) was dissolved in 150 ml. of dioxan containing 0.38 gram of an antioxidant. A polymer with an inherent viscosity of 1.37 was obtained in 96% yield by mixing the solutions. This copolyamide urethane contained 20% by weight of heptamethylene adipamide and 80% by weight of urethane units derived from the reaction of heptamethylene diamine with the bis(chloroformate) of poly(tetramethylene oxide) glycol. This polymer was melt spun at 220° C. After being drawn 6× and heat-set the filaments had a tenacity of 0.81 g.p.d., an elongation of 510%, a stress decay of 10%, and a tensile recovery of 97%.

*Example X*

The bis(chloroformate) solution (31.12 grams) from the preceding example was mixed with 5.56 grams of succinyl chloride and 200 ml. of dioxan. Tetramethylene diamine (8.0 grams) was dissolved in 100 ml. of dioxan containing 0.31 gram of an antioxidant, and the two solutions were mixed with efficient stirring to produce a polymer with an inherent viscosity of 0.90 in 89% yield. This copolyamide urethane contained 20% by weight of tetramethylene succinamide units and 80% by weight of urethane units derived from the reaction of tetramethylene diamine with the bis(chloroformate). Filaments could be prepared from this polymer by melt spinning at 233° C.

*Example XI*

A bis(chloroformate) was prepared by reacting phosgene with poly(tetramethylene oxide) glycol with a molecular weight of 1560 as described previously. A methylene chloride solution of the bis(chloroformate) was placed in a blendor and to it was added with vigorous stirring 100 ml. of an aqueous solution containing trans-2,5-dimethylpiperazine and sodium hydroxide. After the reaction had been allowed to proceed for approximately one minute, a methylene chloride solution of terephthaloyl chloride was added. After a short further reaction period, the reaction mixture was poured into two gallons of boiling water. The methylene chloride was removed and the polymer was washed three times with hot water, then with acetone, and soaked in acetone overnight before filtering and drying. A 94% yield of washed and dried polymer with an inherent viscosity of 1.73 was obtained. This polymer contained 30% by weight of dimethylpiperazine terephthalamide units and 70% by weight of urethane units derived from the reaction of trans-2,5-dimethylpiperazine with the bis(chloroformate) of poly(tetramethylene oxide) glycol. Films cast from a 60/40 trichloroethane/formic acid solution containing approximately 15% of this polymer had the following properties: tenacity=0.24 g.p.d., elongation=729%, initial modulus=0.05 g.p.d., stress decay=12%, and tensile recovery=90%.

*Example XII*

A polymer was prepared as in Example XI except that the starting poly(tetramethylene oxide) glycol had a molecular weight of 2630. The polymer obtained in 91% yield had an inherent viscosity in m-cresol of 3.64 and contained 15% by weight of dimethylpiperazine terephthalamide units and 85% by weight of urethane units derived from the polyether. Films cast from a 60/40 trichloroethane/formic acid solution containing approximately 15% of this polymer had the following properties: tenacity=0.22 g.p.d., elongation=641%, initial modulus=0.07 g.p.d., stress decay=6.4, and tensile recovery=92%.

Example XIII

A polymer similar to the preceding example was prepared except that phthaloyl chloride was substituted for terephthaloyl chloride and the starting poly(tetramethylene oxide) glycol had a molecular weight of 1615. The polymer obtained in 86% yield had an inherent viscosity in trichloroethane/phenol of 3.14 and contained 25% by weight of dimethylpiperazine phthalamide units and 75% by weight of urethane units derived from the polyether. Films cast from a 60/40 trichloroethane/formic acid solution containing approximately 15% by weight of this polymer had the following properties: tenacity=0.38 g.p.d, elongation=1068%, initial modulus=0.06 g.p.d., stress decay=7.6, and tensile recovery=89%.

Example XIV

Poly(tetramethylene oxide) glycol with a molecular weight of approximately 3000 was dried by dissolving it in anhyrous benzene and distilling at atmospheric pressure until the distillate was no longer turbid. Phosgene was bubbled very rapidly into a benzene solution of the dried glycol while the reaction mixture was cooled with ice. After an amount of phosgene about equal in weight to the glycol had been added, the addition was stopped and the solution was allowed to warm up to room temperature overnight while nitrogen was bubbled through the solution maintained under slight vacuum. After most of the excess phosgene had been removed in this manner, the benzene was removed by distilling under vacuum until the solution contained 0.5 gram of the bis(chloroformate) per ml. of solution.

This benzene solution [16 ml.=8 grams (0.0022 mol) of bis(chloroformate)] of the bis(chloroformate) prepared above was placed in a blendor at room temperature with 3.2 grams (0.0099 mol) of 1,5-naphthalene disulfonyl chloride and 80 ml. of methylene chloride. To this was added with vigorous stirring a solution of 1.40 grams (0.0121 mol) of hexamethylene diamine in 67 ml. of water plus 8.5 ml. (0.025 mol) of 3 N sodium hydroxide. After the reaction had run for ten minutes, 50 ml. of methylene chloride was added and stirring continued for ten more minutes. Hot water (500 ml.) was added and the organic solvents removed by evaporation. The polymer was filtered and washed with hot water. It was then stirred in acetone, filtered, washed with acetone, and dried in a vacuum oven at 50° C. overnight. A polymer with an inherent viscosity in m-cresol of 1.84 and a polymer melt temperature of 240° C. was obtained in practically quantitative yields. This copolysulfonamide urethane contained 32% by weight of hexamethylene 1,5-naphthalene sulfonamide units and 68% by weight of urethane units derived from the reaction of hexamethylene diamine with the bis(chloroformate) of poly(tetramethylene oxide) glycol. Tough films were obtained by casting 60/40 trichloroethane/formic acid solutions of this polymer.

Example XV

The bis(chloroformate) (13.3 grams) of poly(ethylene oxide) glycol with a molecular weight of 400 and 3.3 grams of adipyl chloride were dissolved in 100 ml. of carbon tetrachloride. This was mixed with a solution of 15.3 grams of hexamethylene diamine in 300 ml. of water. The polymer which separated was washed in acetone and dried in an oven at 50° C. The tough polymer obtained, from which filaments could be prepared, had an inherent viscosity in m-cresol of 1.06.

In a similar experiment using sebacyl chloride instead of adipyl chloride, a polymer having an inherent viscosity of 1.27 resulted and filaments having a tenacity of 1.4 g.p.d were prepared from it.

Example XVI

Hexamethylenediamine (7.6 grams) and 15.4 grams of sodium carbonate monohydrate were dissolved in 550 ml. of water. During a period of 2 minutes there was added with stirring a solution of 11.35 grams of 1,5-naphthalenedisulfonyl chloride in 950 ml. of methylene chloride and 85.2 grams of a benzene solution containing 43% by weight of the bis(chloroformate) of poly(tetramethylene oxide) glycol with a molecular weight of 1590. The reaction mixture was stirred for 20 minutes at room temperature, and the polymer obtained was washed in boiling water. After air drying for 6 hours, the polymer was extracted and dried at 80° C. in a vacuum oven fitted with a nitrogen bleed. The dried polymer had an inherent viscosity in m-cresol of 1.20 and a polymer melt temperature of 212° C. This polymer contained 25% by weight of hexamethylene 1,5-naphthalenesulfonamide units and 75% by weight of urethane units derived from the reaction of hexamethylenediamine with the polyether bis(chloroformate).

The polymer was dissolved in N,N-dimethylformamide to produce a 22% solution, which was extruded through a spinneret with five 0.005" holes. The spinneret temperature was 95° C., and the filaments were extruded into a column of air maintained at 143–185° C. The slightly tacky filaments were talced before wind-up. After relaxing in boiling water the filaments had the following properties: tenacity=0.30 g.p.d., elongation=536%, initial modulus=0.15 g.p.d., denier=7.8, and fiber stick temperature=156° C.

As shown above, polyamide-forming derivatives of difunctional sulfonic acids may also be used. This includes aliphatic, aromatic, mixed aliphatic-aromatic, and alicyclic acids, and those containing heterocyclic rings. As specific examples may be mentioned 1,5-naphthalenedisulfonic acid, m-benzenedisulfonic acid, 1,6-hexamethylenedisulfonic acid, 1,2-ethanedisulfonic acid, among others. Mixtures of derivatives of these acids or mixtures of these derivatives with derivatives of dicarboxylic acids may be used. They may also be substituted with groups which do not interfere with the reaction. Here also, the acid halides have been found to be very useful polyamide-forming derivatives.

The expression "polymer melt temperature," as used here, is the minimum temperature at which a sample of the polymer leaves a wet, molten trail as it is stroked with moderate pressure across a smooth surface of a heated brass block. "Polymer melt temperature" has sometimes in the past been referred to as "polymer stick temperature." "Initial modulus" is determined by measuring the initial slope of the stress/strain curve.

The diamines used to prepare these polymers may be any primary or secondary aliphatic, alicyclic, heterocyclic, or aromatic diamine. As representative examples may be mentioned: ethylene diamine, propylene diamine, tetramethylene diamine, pentamethylene diamine, hexamethylene diamine, heptamethylene diamine, octamethylene diamine, piperazine, 2,5-dimethylpiperazine, p-xylylene diamine, 1,4-diaminocyclohexane, p-phenylene diamine, 1-methyl-2,4-diaminobenzene, bis(p-aminocyclohexyl) methane, and many others. Mixtures of diamines may be used as well. Derivatives of the diamines listed may also be used as long as the substituents do not interfere with the polymerization. For example, the aliphatic diamines may have hydrocarbon side chains or be substituted with halogens or nitro groups which are inert under the conditions used herein.

The bis(haloformates) of the polyether glycols or of the low molecular weight glycol if any is used, such as that of ethylene glycol, may be the chloro-, bromo-, iodo- or fluoroformates, but usually the bis(chloroformates) will be employed since they are readily available or prepared using phosgene.

Representative difunctional polyethers which may be used include the polyoxathiaalkylene glycols such as poly(1-oxa-4-thiahexane), poly(1,4-dioxa-7-thianonane), and poly(1,6-dioxa-9-thiahendecane), the poly(alkylene oxide) glycols, such as poly(ethylene oxide) glycol, poly(propylene oxide) glycol, poly(tetramethylene oxide) glycol, and poly(decamethylene oxide) glycol; polydioxolane and polyformals prepared by reacting formaldehyde with other glycols or mixtures of glycols, such as tetramethylene glycol and pentamethylene glycol.

The preferred difunctional polyethers are poly(alkylene oxide) glycols, which may be represented by the formula:

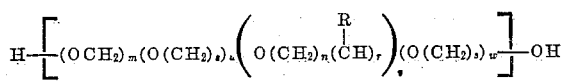

in which $m$ and $r$ are 0 or 1; $n$ is 2–10 when $r$ is 0 and 1–9 when $r$ is 1; $s$ is 0–10, $u$ and $w$ are 1–50; $v$ is 4–125; R is H or a low molecular weight alkyl group such as methyl.

The preferred macrointermediate of this type is poly(tetramethylene oxide) glycol. Particularly useful are the copolymers formed by the bis(chloroformate) of this macroglycol with the following ingredients: (1) dimethylpiperazine and terephthalic acid, (2) hexamethylene diamine and adipic acid, (3) hexamethylene diamine and sebacic acid. Amide-forming derivatives of these ingredients can be used to form the polymer. The elastomers derived from these compositions are also of particular interest. Of special interest are the elastic compositions containing 15–25% by weight of dimethylpiperazine terephthalamide units, 20–30% of hexamethylene adipamide units, or 20–30% of hexamethylene sebacamide units. In each case substantially all of the remainder of the composition would be the urethanes derived from the bis(chloroformates) of poly(tetramethylene oxide) glycols and one of the amines listed.

The polymers of this invention are prepared by two methods: (1) interfacial polymerization, and (2) solution polymerization. Interfacial polymerization has rapidly been attaining increased importance in the polymer field. It is a rapid, moderate temperature reaction in which the reactants are brought together in such a way that the reaction zone is at, or is immediately adjacent to, a liquid-liquid interface. Thus, most of the molecules of at least one of the reactants must diffuse through liquid diluents to arrive at the reaction zone. The reactants in one liquid phase may be one or more of the diamines and the reactants in the other liquid phase may be one or more bis(chloroformates) and one or more diacid halides. The two liquid phases are mixed to form a two-phase system in which the diamine and the diacid halide are in separate phases, at least one of which includes a liquid diluent. Preferably, a reactant is a liquid under the reaction conditions or is dissolved in a diluent, but one of the reactants may be dispersed or suspended as a finely divided solid in a diluent which will dissolve it, at least partially. The phases are mixed until the desired condensation polymerization has taken place and then, if desired, the amide copolymers obtained are isolated.

Low molecular weight polymers have been prepared for some time by forming a homogeneous solution of reactants and allowing the reaction to continue at moderate temperatures or heating to produce the polymers. However, only recently have high molecular weight polymers been prepared successfully by this method. The method used here for preparing these copolyamides involves dissolving the dicarboxylic acid halides and the bis(chloroformates) in one portion of a solvent and the diamines in a separate portion of the same solvent, and then mixing these solutions in the presence of a suitable acid acceptor to form high molecular weight copolyamides. The solvent is one which is inert to the reactants and the molecular weight of the polymers is controlled by the choice of the solvent medium or by the use of mixtures of appropriate solvents.

For optimum results the copolyamides of this invention should have an inherent viscosity of the order of 0.6–2.5 or above, although copolymers having inherent viscosities as low as 0.4 are useful. Polymers in the lower molecular weight range are useful in certain applications, such as in preparation of coatings and molded objects. However, the ones of particular interest are those with molecular weights in the fiber-forming range, i.e., above about 5,000. Inherent viscosity is defined as:

$$\frac{\ln \eta_r}{C}$$

in which $\eta_r$ is the viscosity of a dilute solution of the polymer divided by the viscosity of the solvent in the same units and at the same temperature, and C is the concentration in grams of the polymer per hundred ml. of solution. The inherent viscosities recorded here were measured in m-cresol or trichloroethane/formic acid mixtures. In most cases a concentration of 0.5 gram per 100 ml. of solution was used.

When polymers are prepared by the interfacial or solution methods, the polymer frequently separates as soon as it has reached an adequate molecular weight value. If this does not happen, the polymer can be separated by the addition of a precipitating and/or coagulating agent. However, it is possible to prepare concentrated solutions of many of these polymers by the use of these techniques and such solutions can be used directly in the preparation of filaments, films, ribbons, and similar articles.

This invention represents an important development in that it demonstrates for the first time a method for preparing polymers which have both a high polymer melt temperature and a low glass or second order transition temperature. A number of rubbery polymers with relatively low second order transition temperatures have been prepared. These polymers have invariably had low polymer melt temperatures and tended to creep on extension. Therefore, it has usually been necessary, to cross-link them in order to obtain good elastic properties. These limitations have restricted their usefulness. For example, the insolubility and infusibility of the cross-linked products makes subsequent shaping difficult. Polymers with high polymer melt temperatures also have had, in the past, high second order transition temperatures; this means that they tend to be non-elastic at room temperatures. The transition temperatures can be lowered and the room temperature elasticity correspondingly increased through copolymer formation. However, this has invariably led to a large drop in the polymer melt temperature.

The elastic polymers of this invention are unique in that they are linear polymers with properties equivalent to those of the cured cross-linked elastic products now available. This has been accomplished by substituting crystalline, high melting components for the chemical cross-links of cured elastomers, such as rubber. The absence of chemical cross-links results in improved solubility. The practical end result is that these polymers can be dissolved in fairly common solvents which can be used to prepare solutions which are readily adapted to the preparation of filaments.

The copolyamides of this invention have properties which make them useful in many applications. Thus, they can be molded to form a variety of shaped objects, extruded to form bars, rods, tubes, films, filaments, fibers, and the like. In filament form they are useful in such applications as fabrics, rope, papers, felts, and similar articles. Heavier denier filaments are useful in such applications as bristles. The elastic polymers of this invention can be used as binders in papers and laminates.

The elastic copolyamides, and especially the elastic filaments, are a particularly desirable feature of this invention. The best compositions of this invention exhibit stress decay properties nearly equivalent to those of rubber. The higher tenacities, high initial modulus, better abrasion resistance, and more easily controlled elongation of these filaments fit them for many applications for which rubber is undesirable. Most of these filaments possess the additional advantage that they are easily fabricated. A large percentage of the rubber threads used are prepared by slitting rubber sheets. This produces relatively large denier filaments which cannot be converted readily into multifilaments and are not acceptable for many uses, particularly in certain fabrics. Finer denier monofilaments and multifilaments can be prepared by extruding and coagulating rubber dispersions, but this process has proved to be expensive and the product is frequently unsatisfactory. Both types of rubber products have poor abrasion resistance. These disadvantages are entirely avoided by this invention.

Some of the polyamide urethane compositions of this invention also possess the desirable characteristic of being hydrophilic. The ability to absorb moisture is desirable for a textile fiber because fabrics made from them are more comfortable to wear. The low moisture absorption of many of the hydrophobic fibers now available is undesirable in many applications.

Although the polymers of this invention possess many desirable properties, it is sometimes necessary to stabilize those prepared from certain of the compositions to heat or radiation by ultra-violet light. Fortunately, this can be done very readily by incorporating stabilizers. Satisfactory stabilizers comprise phenols and their derivatives, amines and their derivatives, compounds containing both hydroxyl and amine groups, hydroxyazines, oximes, polymeric phenolic esters, and salts of multivalent metals in which the metal is in its lower valent state. An extensive list of suitable stabilizers is given in the copending application of Shivers, Serial No. 329,114, filed December 31, 1952.

Filaments can be prepared by melt, dry or wet spinning procedures. In melt spinning, care should be taken to avoid thermal degradation. In shaping filaments using solutions, solvents which have been found satisfactory for preparing solutions of suitable concentration are N,N-dimethylformamide, N,N-dimethylacetamide, tetramethylene cyclic sulfone, formic acid, and 60/40 trichloroethane/formic acid mixtures.

Conventional conditions are used for dry spinning, except that the elastic filaments usually have to be talced or lubricated, usually with water, because they tend to be somewhat tacky immediately after extrusion. Spinning speeds are usually somewhat lower than those used in some commercial processes for textile filaments, but speeds in excess of 300 yards per minute have been attained with the elastic filaments of this invention. This is considered excellent for filaments of this type.

When wet spinning, the spinning speeds are usually lower, but this procedure has a definite advantage when larger denier filaments are being prepared. A preferred solvent for wet spinning is N,N-dimethylformamide. The polymer solutions in this solvent are generally extruded into a hot water bath.

It is possible to prepare stable dispersions of certain polymers of this invention, including the elastomeric ones, and shaped articles can be prepared by extruding, coagulating and coalescing the polymer particles. In some instances heat coalescence will be satisfactory but for others a solvent will have to be used to promote coalescence. Shaping and polymerization can also be combined into a single step.

Cold drawing is not essential for producing filaments with desirable properties, particularly in the case of the elastic filaments. However, the overall properties of many of these filaments are improved by cold drawing operations which result in increased orientation and crystallinity in the final structure. Therefore, prior to final packaging, the yarns may be drawn at a suitable draw ratio, such as 2 to 10×, for the particular copolymer, and relaxed, to give a product with a desired combination of tenacity, initial modulus, yarn elongation, elasticity, and similar properties.

The elastic polymer yarns of this invention are characterized by higher strength and stretch modulus and substantially better abrasion resistance than any rubber threads known. For example, the filaments of this invention have an abrasion resistance about 30 times that of rubber. Stretch modulus measures the force required to elongate the yarn a given percentage. A garment of yarns having high tenacity and high stretch modulus will not only be durable but will also exert substantial pressure on the body of the wearer after the garment is stretched into position as desired, for example, in surgical stockings. Yarns of this invention have many advantages over rubber threads. For example, they may be spun readily into multifilament yarns and into low denier filaments. They have a very low inherent color, superior abrasion resistance, may be dyed by common dyestuffs, need no plasticizers which might later be leached out of the yarn, and have a good resistance to perspiration or greases and many other common chemicals. Furthermore, these elastic yarns are capable of very quick elastic recovery, a property which is lacking in many of the so-called elastic fibers.

The elastic properties attained by this invention result in part from the novel combination of a segment of a hard or high melting polymer with a "soft" or low melting polymeric segment. The polymers from which the former segments are derived all melt above 200° C., some melting points being exemplified as follows: poly(hexamethylene sebacamide), 209° C.; poly(hexamethylene adipamide), 250° C.; poly(dimethylpiperazine terephthalamide), above 400° C.; poly(tetramethylene adipamide), 278° C.; and poly(ethylene sebacamide), 254° C. The melting points of the polyether glycols are below about 50° C., as for example, poly(tetramethylene oxide) glycol having an average molecular weight of 1000, about 20° C.; poly(tetramethylene oxide) glycol having a molecular weight of 1500, about 30° C.; and poly(tetramethylene oxide) glycol of 3000 molecular weight, about 40° C. The melting points of the polyether glycols are generally not sharp and may vary for a given molecular weight. Thus, some samples of the higher molecular weight polyether glycols may have apparent melting points as high as 55° C. The "hard" segments may be combined with the low melting segments to produce a large number of the elastomers of this invention.

Any departure from the above description which conforms to the present invention is intended to be included within the scope of the claims.

I claim:

1. A linear amide/urethane/ether copolymer consisting essentially of a multiplicity of amide segments containing at least one repeating unit of a fiber-forming polyamide, said repeating unit being of the formula

—A—X—D—X— where —A— is a bivalent organic radical containing terminal nitrogen atoms, to each of which nitrogen atoms is attached one of the indicated free valences of the said radical —A—; X is a group selected from the class consisting of

and

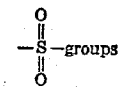

and wherein —D— is the residue remaining after removal of the functional acid groups from an organic dibasic acid selected from the class consisting of dicarboxylic acids HOOC—D—COOH, and disulfonic acids $$HO_3S—D—SO_3H$$

the said polyamide having a melting point of at least 200° C. in the fiber-forming molecular weight range, at least some of said amide segments being connected by urethane linkages of the formula $$—\underset{|}{N}—\underset{\|}{\overset{O}{C}}—O—$$

wherein $$—\underset{|}{N}—$$

is one of the terminal nitrogen atoms of the aforementioned radical —A—, to polyether residues which are the radicals remaining after removal of the terminal hydroxyl groups of a polyether glycol consisting essentially of divalent hydrocarbon groups joined by intralinear ether oxygen atoms, said polyether glycol having a melting point below about 50° C. and a molecular weight above about 400, said polyether residues constituting about 60% to about 90% by weight of said copolymer.

2. The linear amide/urethane/ether copolymer of claim 1 in the form of a filament.

3. The linear amide/urethane/ether copolymer of claim 1 in the form of a film.

4. The copolymer of claim 1 in which the said polyether glycol is poly(tetramethylene oxide) glycol.

5. The filament of claim 2 which has an elastic recovery above 90% and a stress decay below 20%.

6. The filament of claim 2 in which the copolymer has a melt temperature above 150° C.

7. The linear amide/urethane/ether copolymer of claim 1 in which a minor proportion of urethane linkages are present in the said amide segments.

8. A process for preparing a linear amide/urethane/ether copolymer which comprises condensing as essentially the sole polymer-forming ingredients (A) one molar equivalent of an organic diamine containing at least one hydrogen atom attached to each of the nitrogen atoms thereof and (B) one molar equivalent of a mixture of (1) a polyamide-forming derivative of an organic dibasic acid selected from the group consisting of disulfonic acids and dicarboxylic acids, and (2) a bis(haloformate) of a polyether glycol having a molecular weight above about 400 and a melting point below about 50° C. and consisting essentially of divalent hydrocarbon groups joined by intralinear ether oxygen atoms, the proportions of the ingredients in (B) being so selected that about 60-90% by weight of said copolymer is contributed by the said polyether glycol, with the proviso that the said organic diamine and the said derivative of a dibasic acid are so selected that if reacted alone they would form a fiber-forming polyamide having a melting point of at least about 200° C. in the fiber-forming molecular weight range.

9. The process of claim 8 in which the bis(haloformate) is bis(chloroformate).

10. The process of claim 8 in which the molecular weight of the polyether glycol is between about 800 and about 5,000.

11. The process of claim 8 in which the copolymer has an equivalent inherent viscosity between about 0.4 and about 2.5 determined in a 0.5 gram/100 cc. concentration in m-cresol.

12. The process of claim 8 in which the polyether glycol is a poly(alkylene oxide) glycol.

13. The process of claim 12 in which the poly(alkylene oxide) glycol is poly(tetramethylene oxide) glycol.

14. The process of claim 8 in which the said organic diamine is an aliphatic diamine.

15. The process of claim 14 in which the said organic diamine is hexamethylene diamine.

16. The process of claim 8 in which the said organic diamine is a heterocyclic diamine.

17. The process of claim 16 in which the said organic diamine is a piperazine.

18. The process of claim 8 in which the molecular weight of the linear amide/urethane/ether copolymer is above about 5,000.

19. The process of claim 8 in which (B) also contains a minor proportion of a bis(haloformate) of a glycol having a molecular weight below 400.

References Cited in the file of this patent

UNITED STATES PATENTS 2,692,873   Langerak _____ Oct. 26, 1954

FOREIGN PATENTS 895,395   France _____ Apr. 3, 1944
519,014   Belgium _____ Oct. 5, 1953
904,471   Germany _____ Feb. 18, 1954
074,451   France _____ Mar. 5, 1954

OTHER REFERENCES

Journal of Polymer Science, page 262, vol. 8, No. 3 (1952). (Copy in Scientific Library.)

Hill: "Fibres from Synthetic Polymers," page 134 (1953), Elsevier Publishing Co., New York, N.Y. (Copy in Scientific Library.)